United States Patent

Gustafson et al.

[15] 3,680,087

[45] July 25, 1972

[54] SCAN CONVERSION THROUGH ELECTROLUMINESCENT STORAGE PANELS

[72] Inventors: Walter R. Gustafson, Furlong; William H. McMillen, Perkasie; Lewis Lippel, Jr., Warminster, all of Pa.

[73] Assignee: The United States of America as represented by the Secretary of the Navy

[22] Filed: Oct. 20, 1970

[21] Appl. No.: 82,243

[52] U.S. Cl. ..........343/5 SC, 178/6.8

[51] Int. Cl. ..........G01s 9/00

[58] Field of Search ..........343/5 SC, 5 R, 6 R; 178/6.8

[56] References Cited

UNITED STATES PATENTS 3,569,616 3/1971 Baker ..........178/6.8

*Primary Examiner*—Samuel Feinberg
*Attorney*—R. S. Sciascia and Henry Hansen

[57] ABSTRACT

A system for displaying on a cathode ray tube data contained in modulating signals not compatible with the scan of the cathode ray tube. The modulating signals are first applied to an electro-optic crystal for modulating a laser beam in order to present the information on an electroluminescent storage panel. A vidicon camera having a scan compatible with the CRT senses the information on the electroluminescent panel and provides an electrical signal containing the data and this is displayed on the CRT. A plurality of additional signals are also adapted for display on the same CRT. A manual selector determines which of the plurality of signals is to be displayed.

9 Claims, 1 Drawing Figure

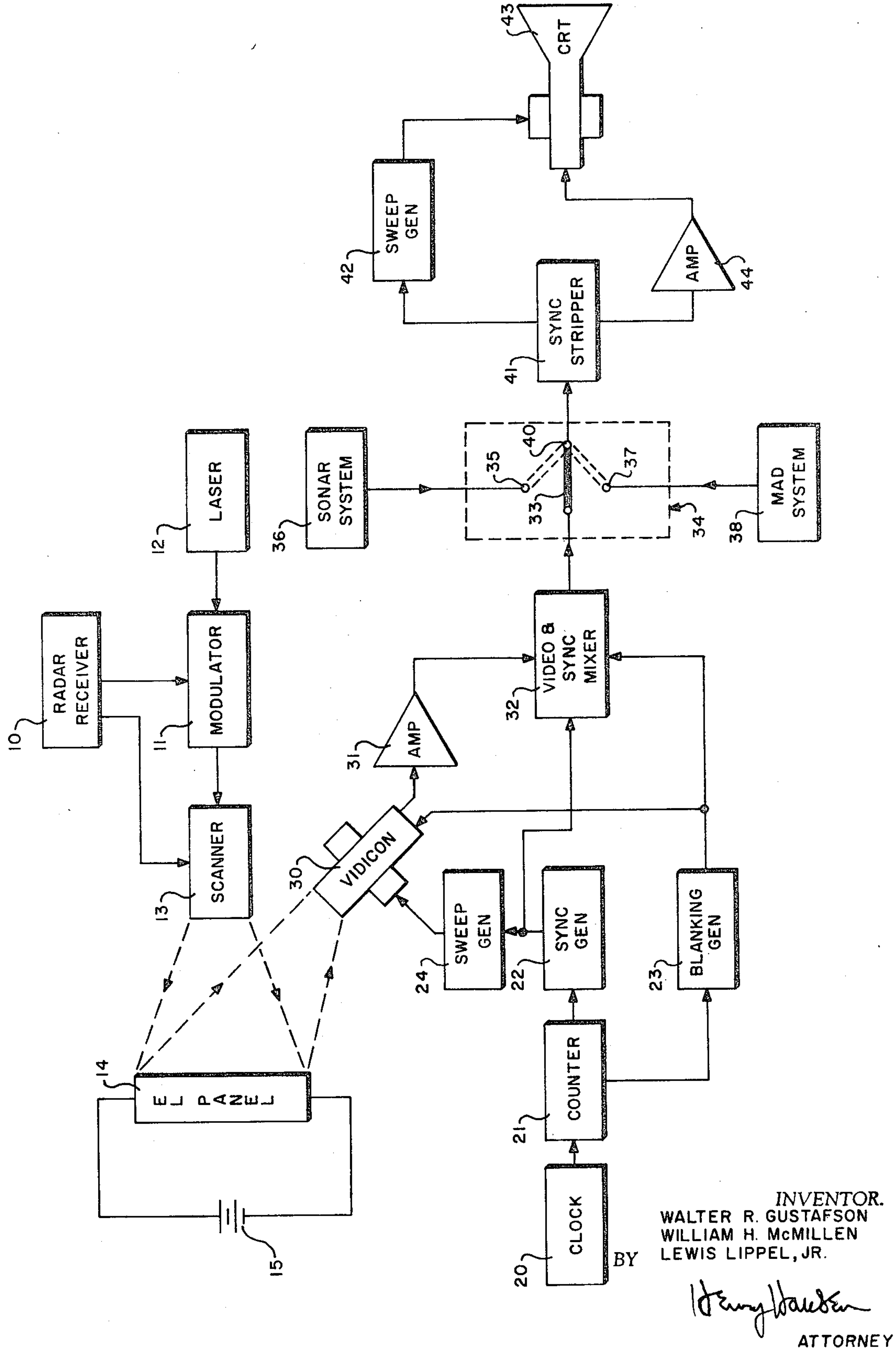
INVENTOR.
WALTER R. GUSTAFSON
WILLIAM H. McMILLEN
LEWIS LIPPEL, JR.
BY
[signature]
ATTORNEY

SCAN CONVERSION THROUGH ELECTROLUMINESCENT STORAGE PANELS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention generally relates to display systems and more particularly to the sequential displaying of received information of a plurality of systems in aircraft in which the signals and the system receiving the information are incompatible with the scanning network of the display device.

Aircraft generally have limited display area for viewing systems such as radar, sonar, MAD, etc. This makes it desirable for a single cathode ray tube to display all of the required data. However, this is normally not possible as the scan format of the cathode ray tube is often incompatible with the information received so that a meaningful display cannot be provided.

In the prior art, display systems have been provided with scan conversion by utilizing equipment in which specific components are designed to scan in a plurality of waveforms in order to provide the desired waveform as an output. Such devices unnecessarily complicate scan conversion and have lower resolution and higher cost than the present device. In addition, intricate connections between the display device and the remainder of the system make it difficult to display data from more than one system.

SUMMARY OF THE INVENTION

Accordingly, it is the general purpose of the present invention to provide a low cost, high resolution display system in which a plurality of inputs may be displayed on the same output device.

This is accomplished by first displaying the data received from a first input on an electroluminescent panel by means of a laser beam, modulation device and scanner. A vidicon camera then reads the information on the panel and supplies electrical signals indicative of the information to an output display device. A switch is located intermediate the vidicon camera and output display device for selecting the electrical signals from the vidicon camera or any of a plurality of other input signals that are applied to different contacts on the switch.

BRIEF DESCRIPTION OF THE DRAWING

DESCRIPTION OF THE PREFERRED EMBODIMENT

Referring now to the FIGURE there is shown a side looking radar receiver 10 that supplies electrical signals containing video information to a modulator 11 and type "B" scan information to a scanner 13. The modulator 11 comprises a crystal of potassium/deuterium phosphate for receiving a coherent light beam from an ultra-violet laser 12. The scanner 13 on receiving signals from both modulator 11 and receiver 10 provides video information for display on an electroluminescent panel 14. The electroluminescent panel 14 is provided with a d.c. electrical power supply 15 and the removal of such power supply erases the information from the panel 14.

A clock 20 provides pulses to a counter 21 that in turn provides signals to both a sync generator 22 and a blanking generator 23. The output of the sync generator 22 is applied to a sweep generator 24 that supplies a raster pattern signal to the deflection coils of a vidicon tube 30. As shown in the FIGURE the signal from the blanking generator 23 is also applied to vidicon tube 30.

The vidicon tube 30 is used to read the information displayed on the electroluminescent panel 14 and to supply an electrical signal indicative of this information. The output electrical signal of the vidicon tube 30 is then applied to a video amplifier 31. A video and sync mixer 32 receives signals from video amplifier 31, sync generator 22 and blanking generator 23 and supplies an output signal to terminal 33 of selector switch 34. Switch 34 has in addition terminals 35 and 37 for receiving input signals from a sonar system 36 and a MAD system 38, respectively.

The output terminal 40 of switch 34 is connected to sync stripper 41 which separates the sync pulse from the remainder of the signal and applies it to a sweep generator 42 whose output provides a scanning signal for cathode ray tube 43. The video information is applied to CRT 43 through video amplifier 44 from sync stripper 41.

The details of the MAD system 38 and sonar system 36 are not shown. However, both systems must be able to provide a signal compatible with the scan of cathode ray tube 43. This may be available directly from the sonar and MAD receivers or a scan converter system similar to that used in processing the signal from radar receiver 10 may be utilized.

The operation of the device will now be described with reference to the FIGURE. The radar receiver 10 on receiving data provides a data signal to a modulator 11 and type "B" scan information to scanner 13. A coherent light beam from laser 12 is supplied to the modulator 11 which applies the data information to the light beam. The output of the modulator 11 is supplied to scanner 13. Scanner 13 then supplies video information in type "B" scan presentation to electroluminescent panel 14.

A vidicon tube 30 operating with a raster waveform views the electroluminescent panel 14 and provides an output electrical signal to video amplifier 31. The signal is then supplied to video and sync mixer 32 along with signals from sync generator 22 and blanking generator 23. The output of video and sync mixer 32 is then supplied to sync stripper 41 through selective switch 34. The sync stripper supplies the sync signal to sweep generator 42 that in turn supplies to the cathode ray tube 43 the same raster pattern used by vidicon 30. The picture information is then applied to the CRT 43 for viewing through video amplifier 44 from sync stripper 41. In this manner it can be seen that a radar receiver supplying a signal to be viewed by a type "B" scanning system can be viewed on a CRT that is provided with a raster waveform. A sonar system 36 and a MAD system 38 may also be connected to switch 33 so that such signals may also be provided to the CRT 43 for display.

In addition to the use of an ultra-violet laser beam for writing on the panel 14 and the removal of electrical power from the panel 14 for erasing, other methods of displaying an input electrical signal on a solid state storage panel may be utilized. One such method would be to write with an infrared laser beam on a librasscope panel and erase with an ultra-violet flood gun. Another method using a librascope panel would be to write on the panel an infrared laser and erase using an ultra-violet laser or vice-versa.

It has therefore been shown that signals incompatible with a display device may be sequentially shown on the display by applying an input electrical signal to an electro-optic crystal transducer for modulating a laser beam for display on a panel. The information is then read off the panel by a vidicon camera whose output electrical signal is compatible for being shown on a particular display device. By means of a switching arrangement, a plurality of such input signals may be provided to a single display device for using a minimum of area on a control panel where available space is at a premium.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A radar display system comprising:

a radar receiver for supplying first and second electrical signals of data and scan information respectively indicative of received signals;

laser means for supplying a coherent light beam;

a modulator positioned and connected to receive respectively the coherent light beam and the first electrical signal for modulating the coherent light beam in accordance with the data information and providing an output optical signal indicative of data information;

scanning means connected to receive the second electrical signal and optical signal for providing the optical signal in a first scan format;

panel means positioned to receive the optical signal for displaying the data information contained therein;

camera means positioned to read the data information displayed on said panel means for providing a third electrical signal indicative of the data information in a second type scan format differing from said first scan format; and display means having a sync stripper operatively connected to receive the third electrical signal for providing a first output signal of sync pulse and a second output signal of data information, a sweep generator connected to receive the first output signal for providing a fourth electrical signal indicative of the scan information in the second type scan format, a video amplifier connected to receive the second output signal and for providing an amplified output signal indicative of the data information, and a cathode ray tube connected to receive the output signals of said sweep generator and said video amplifier for providing a visual display of the data information in said second type scan format.

2. A radar display system according to claim 1 wherein said panel means further comprises:

an electroluminescent panel for displaying the optical signal; and power supply means connected to said electroluminescent panel for providing a d.c. power supply thereto.

3. A radar display system according to claim 2 wherein said modulator further comprises a crystal of potassium/deuterium phosphate for transducing the first electrical signal to the optical signal.

4. A radar display system according to claim 3 wherein said camera means further comprises:

a sync generator supplying a sync pulse;

a sweep generator connected to receive the sync pulse and adapted to supply an output signal indicative of said second type scan format;

a blanking generator adapted to supply a blanking signal;

a vidicon tube connected to receive the output of said sweep generator and said blanking generator and positioned and connected to read the data information from said panel means in said second type scan format and to provide an output electrical signal indicative of the data information in said second type scan format;

a video amplifier connected to receive the output electrical signal of said vidicon tube and adapted to supply an amplified output electrical signal; and a video and sync mixer connected to receive the output signals of said video amplifier, said sync generator and said blanking generator and adapted to supply said third electrical signal.

5. A display system comprising:

a radar receiver for supplying first and second electrical signals of data and scan information respectively indicative of received signals;

laser means for supplying a coherent light beam;

a modulator positioned and connected to receive respectively the coherent light beam and the first electrical signal for modulating the coherent light beam in accordance with the data information and providing an output optical signal indicative of data information;

scanning means connected to receive the second electrical signal and optical signal for providing the optical signal in a first scan format;

panel means positioned to receive the optical signal for displaying the data information contained therein;

camera means positioned to read the data information displayed on said panel means for providing a third electrical signal indicative of the data information in a second type scan format differing from said first scan format;

switching means adapted to select one of a plurality of input signals, one of said signals being the third electrical signal; and display means operatively connected to receive the third electrical signal for visually displaying the data information therein.

6. A display system according to claim 5 wherein said display means further comprises:

a sync stripper operatively connected to receive the third electrical signal for providing a first output signal of sync pulse and a second output signal of data information;

a sweep generator connected to receive the first output signal for providing a fourth electrical signal indicative of the scan information in the second type scan format;

a video amplifier connected to receive the second output signal for providing an amplified output signal indicative of the data information; and a cathode ray tube connected to receive the output signals of said sweep generator and said video amplifier for providing a visual display of the data information in said second type scan format.

7. A display system according to claim 6 wherein said panel means further comprises:

an electroluminescent panel for displaying the optical signal; and power supply means connected to said electroluminescent panel for providing a d.c. power supply thereto.

8. A display system according to claim 7 wherein said modulator further comprises a crystal of potassium/deuterium phosphate for transducing the first electrical signal to the optical signal.

9. A display system according to claim 8 wherein said camera means further comprises:

a sync generator supplying a sync pulse;

a sweep generator connected to receive the sync pulse and adapted to supply an output signal indicative of said second type scan format;

a blanking generator adapted to supply a blanking signal;

a vidicon tube connected to receive the output of said sweep generator and said blanking generator and positioned and connected to read the data information from said panel means in said second type scan format and to provide an output electrical signal indicative of the data information in said second type scan format;

a video amplifier connected to receive the output electrical signal of said vidicon tube and adapted to supply an amplified output electrical signal; and a video and sync mixer connected to receive the output signals of said video amplifier, said sync generator and said blanking generator and adapted to supply said third electrical signal.

* * * * *